US011356852B2

(12) United States Patent
Mbonye et al.

(10) Patent No.: US 11,356,852 B2
(45) Date of Patent: Jun. 7, 2022

(54) BACKUP CELLULAR CONNECTIVITY FOR ESSENTIAL SERVICES

(71) Applicant: Apple Inc., Cupertino, CA (US)

(72) Inventors: Gahima S. Mbonye, San Jose, CA (US); Eduardo de Almeida Abrantes, San Francisco, CA (US); Krishna Myneni, Sunnyvale, CA (US); Lakshmi N. Kavuri, Cupertino, CA (US); Murtaza A. Shikari, Mountain View, CA (US); Raj S. Chaugule, Santa Clara, CA (US); Sanjeevi Balasubramanian, San Jose, CA (US); Shiva Krishna Narra, San Jose, CA (US); Srinivasan Nimmala, San Jose, CA (US); Sriram Subramanian, Santa Clara, CA (US); Vikram B. Yerrabommanahalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/922,813

(22) Filed: Jul. 7, 2020

(65) Prior Publication Data
US 2021/0037389 A1     Feb. 4, 2021

Related U.S. Application Data

(60) Provisional application No. 62/881,439, filed on Aug. 1, 2019.

(51) Int. Cl.
*H04W 12/126*    (2021.01)
*H04W 12/06*     (2021.01)
(Continued)

(52) U.S. Cl.
CPC ......... *H04W 12/126* (2021.01); *G08B 13/22* (2013.01); *H04W 4/029* (2018.02); *H04W 12/06* (2013.01);
(Continued)

(58) Field of Classification Search
CPC ... H04W 12/126; H04W 4/029; H04W 12/06; H04W 12/48; H04W 12/71; H04W 76/18;
(Continued)

(56) References Cited

U.S. PATENT DOCUMENTS 9,992,701 B2    6/2018  Egner et al.
10,440,034 B2  10/2019  Hauck et al.
(Continued)

*Primary Examiner* — Mazda Sabouri
(74) *Attorney, Agent, or Firm* — Kowert, Hood, Munyon, Rankin & Goetzel, P.C.

(57) ABSTRACT

Methods and devices for a user equipment (UE) device to utilize an electronic subscriber identity module (eSIM) to provide backup cellular connectivity for essential services and security enhancements. A UE device receives user input to alter an operational state of the UE. The user input may include removing a physical subscriber identity module (SIM) card installed in the UE or attempting to power off the UE. In response to receiving the user input, an authorization process is initiated. In response to determining that the authorization process has failed, a security enhancement is implemented for the UE.

20 Claims, 14 Drawing Sheets

(51) Int. Cl.
*H04W 76/18* (2018.01)
*G08B 13/22* (2006.01)
*H04W 4/029* (2018.01)
*H04W 12/48* (2021.01)
*H04W 12/71* (2021.01)

(52) U.S. Cl.
CPC ........... *H04W 12/48* (2021.01); *H04W 12/71* (2021.01); *H04W 76/18* (2018.02)

(58) Field of Classification Search
CPC ..... H04W 64/003; H04W 4/90; H04W 8/183; H04W 8/205; H04W 52/0261; H04W 76/10; H04W 76/50; H04W 76/14; H04W 88/04; H04W 88/06; G08B 13/22; G08B 25/08
See application file for complete search history.

(56) References Cited

U.S. PATENT DOCUMENTS

| | | | |
|---|---|---|---|
| 2008/0301776 A1 | 12/2008 | Weatherford | |
| 2009/0323673 A1* | 12/2009 | Gabbay | H04M 1/2535 370/352 |
| 2014/0364099 A1* | 12/2014 | Pai | G06F 9/44505 455/418 |
| 2017/0171742 A1* | 6/2017 | Yang | H04W 8/205 |
| 2018/0110081 A1* | 4/2018 | Serna | H04W 12/068 |
| 2018/0139788 A1* | 5/2018 | Jhunjhunwala | H04W 76/50 |
| 2019/0124124 A1* | 4/2019 | Chong | H04W 48/18 |
| 2021/0235541 A1* | 7/2021 | Seol | H04W 4/90 |

* cited by examiner

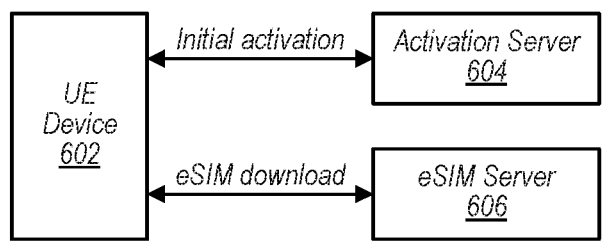
Or
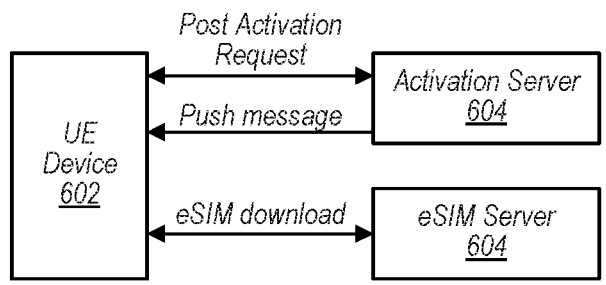
Fig. 6

BACKUP CELLULAR CONNECTIVITY FOR ESSENTIAL SERVICES

PRIORITY CLAIM

This application claims priority to U.S. Provisional Patent Application No. 62/881,439, titled "Backup Cellular Connectivity for Essential Services" and filed on Aug. 1, 2019, which is hereby incorporated by reference in its entirety, as though fully and completely set forth herein.

FIELD

The present application relates to wireless communication, including implementing enhanced security protocols and utilizing an electronic subscriber identity module (eSIM) on a user equipment (UE) device to provide backup cellular connectivity for essential services.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets, which users often carry on their person or hold. Because of the expense of these devices, as well as the personal financial and other valuable information stored on these devices, they may unfortunately be a target for theft. Additionally, because of the relatively small form factor of these devices, a user may inadvertently misplace or lose their device. Accordingly, the user may benefit from security enhancements and more effective device recovery methods. Thus, improvements in the field are desirable.

SUMMARY

Embodiments are presented herein of, inter alia, a user equipment (UE) device, which may be a smart phone or an accessory device, such as a wearable device, and associated methods for enabling the device to implement enhanced security protocols and to utilize an eSIM for backup cellular connectivity for essential services.

In some embodiments, a UE device receives user input to alter an operational state of the UE. The user input may include removing a physical subscriber identity module (SIM) card installed in the UE or attempting to power off the UE. In response to receiving the user input, an authorization process is initiated. In response to determining that the authorization process has failed, a security enhancement is implemented for the UE.

In some embodiments, the UE device may attempt to initiate a high-priority call or an essential service, and the UE may determine that it is unable to successfully initiate the high-priority call or the essential service. In response to determining that the UE is unable to successfully initiate the high-priority call or essential service, the UE may activate an electronic subscriber identity module (eSIM), establish a connection with a cellular network using the eSIM, perform the high-priority call or the essential service using the established connection.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 6 is a schematic illustration of two alternatives for setting up an electronic subscriber identity module (eSIM);

Figure 1:
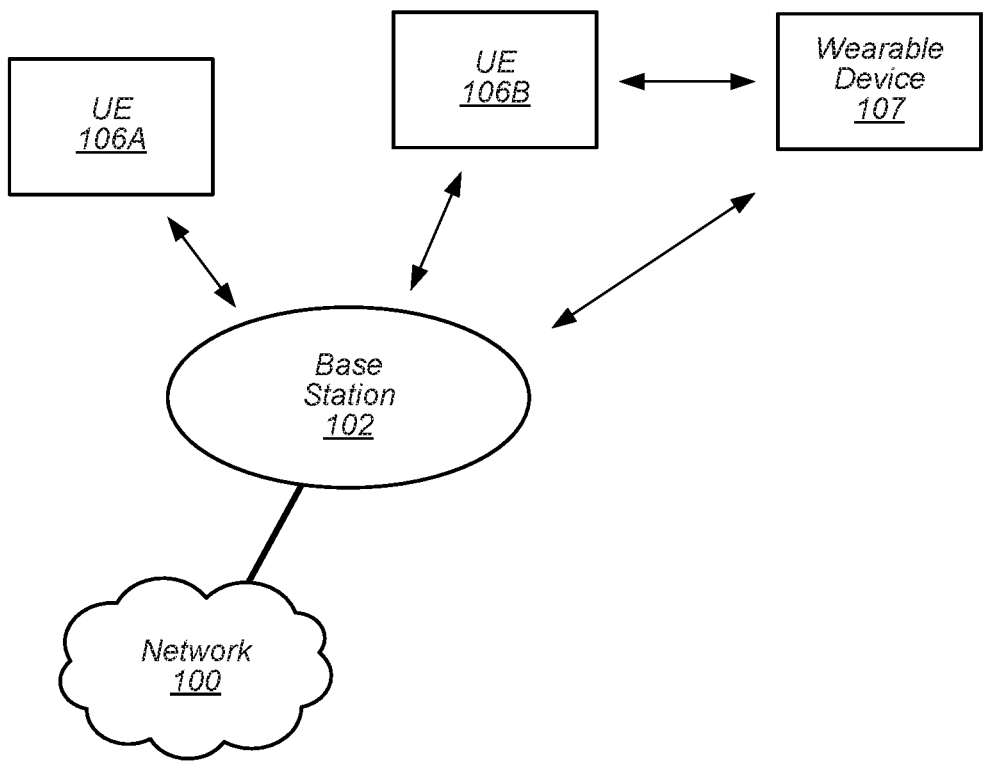
FIG. 1 illustrates an example wireless communication system including a wearable device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as a small form factor device, which as an example may be a accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA). The base station 102 (or similar network infrastructure) may also support other communication technologies, such as text messaging, e.g., SMS (Short Message Service) and similar text messaging technologies, such as iMessage, Facebook Messenger, Whatsapp, etc.

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc. One example of LTE or LTE-A communications may be VoLTE (Voice over LTE).

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, WLAN (Wi-Fi), Bluetooth, WiMAX, one or more global navigational satellite systems (GNSS, e.g., GPS or GLONASS), one and/or more mobile television broadcasting standards (e.g., ATSC-M/H), SMS, etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with communication capability, such as cellular communications capability. The UE 106B may be configured to communicate with the accessory device 107, which may be a small form factor device or wearable device. The accessory device 107 may be any of various types of devices. Typically, the accessory device may be a wearable device that has a smaller form factor with limited battery, output power and/or communications abilities relative to UEs 106. As one common example, the UE 106B may be a smart phone carried by a user, and the accessory device 107 may be a smart watch worn by that same user, or possibly a different user. Thus, as another example, in the operation described herein the UE 106B may be a smart phone carried by a first user, and the accessory device 107 may be a smart watch worn by a second, different user. The UE 106B and the accessory device 107 may communicate using any of various short-range communication protocols, such as Bluetooth, Wi-Fi, etc.

The accessory device 107 may include communications capability, e.g., cellular communication capability, and hence may be able to directly communicate with cellular base station 102. However, since the accessory device 107 is possibly limited in one or more of its communication capabilities, output power, and/or battery, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

Figure 2:
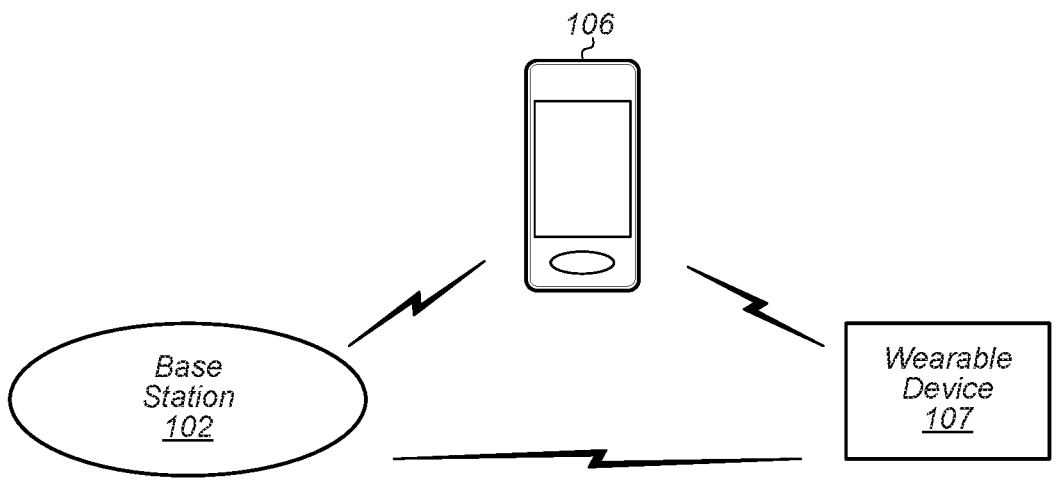
FIG. 2 illustrates an example system in which a wearable device can selectively either directly communicate with a cellular base station or utilize the cellular capabilities of an intermediate or proxy device such as a smart phone, according to some embodiments.

FIG. 2—Example System with a Wearable Device

FIG. 2 illustrates an example accessory device (AD) 107 (e.g., a small form factor device) in communication with base station 102 and a UE 106. The AD may be a wearable device such as a smart watch. The accessory device 107 may comprise cellular communication capability and be capable of directly communicating with the base station 102 as shown. When the accessory device 107 is configured to directly communicate with the base station, the wearable device may be said to be in "autonomous mode."

The accessory device 107 may also be capable of communicating with another device (e.g., UE 106), referred to as a proxy device or intermediate device, using a short-range communications protocol, and may then use the cellular functionality of this proxy device for communicating cellular voice/data with the base station 102. In other words, the accessory device 107 may provide voice/data packets intended for the base station 102 over the short-range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short-range link to the wearable device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device 107 may be said to be in "relay mode."

Various embodiments herein are described with respect to the accessory device 107 selectively using either its own cellular functionality (autonomous mode) to communicate with a base station, or using the cellular functionality of the UE 106 (relay mode) for communications, e.g., for LTE or VoLTE. However, embodiments described herein may also be used with other radio access technologies (RATs), such as to enable the accessory device 107 to selectively using either its own Wi-Fi functionality (autonomous mode) to communicate with a Wi-Fi access point, or use the Wi-Fi functionality of the UE 106 (relay mode) for Wi-Fi communications.

The accessory device 107 may include a processor that is configured to execute program instructions stored in memory. The accessory device 107 may perform any of the method embodiments described herein by executing such stored instructions. Alternatively, or in addition, the accessory device 107 may include a processing element, such as a programmable hardware element such as an FPGA (field-programmable gate array), integrated circuit (IC), or other circuitry, that is configured to perform any of the method embodiments described herein, or any portion of any of the method embodiments described herein.

The accessory device 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE (or LTE-Advanced) or Bluetooth, and separate radios for communicating using each of LTE-Advanced and Bluetooth. Other configurations are also possible.

The small form factor device (e.g., wearable device) 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. When the UE 106 is capable of being used by the accessory device 107 as a proxy, the UE 106 may be referred to as a companion device to the accessory device 107.

Figure 3:
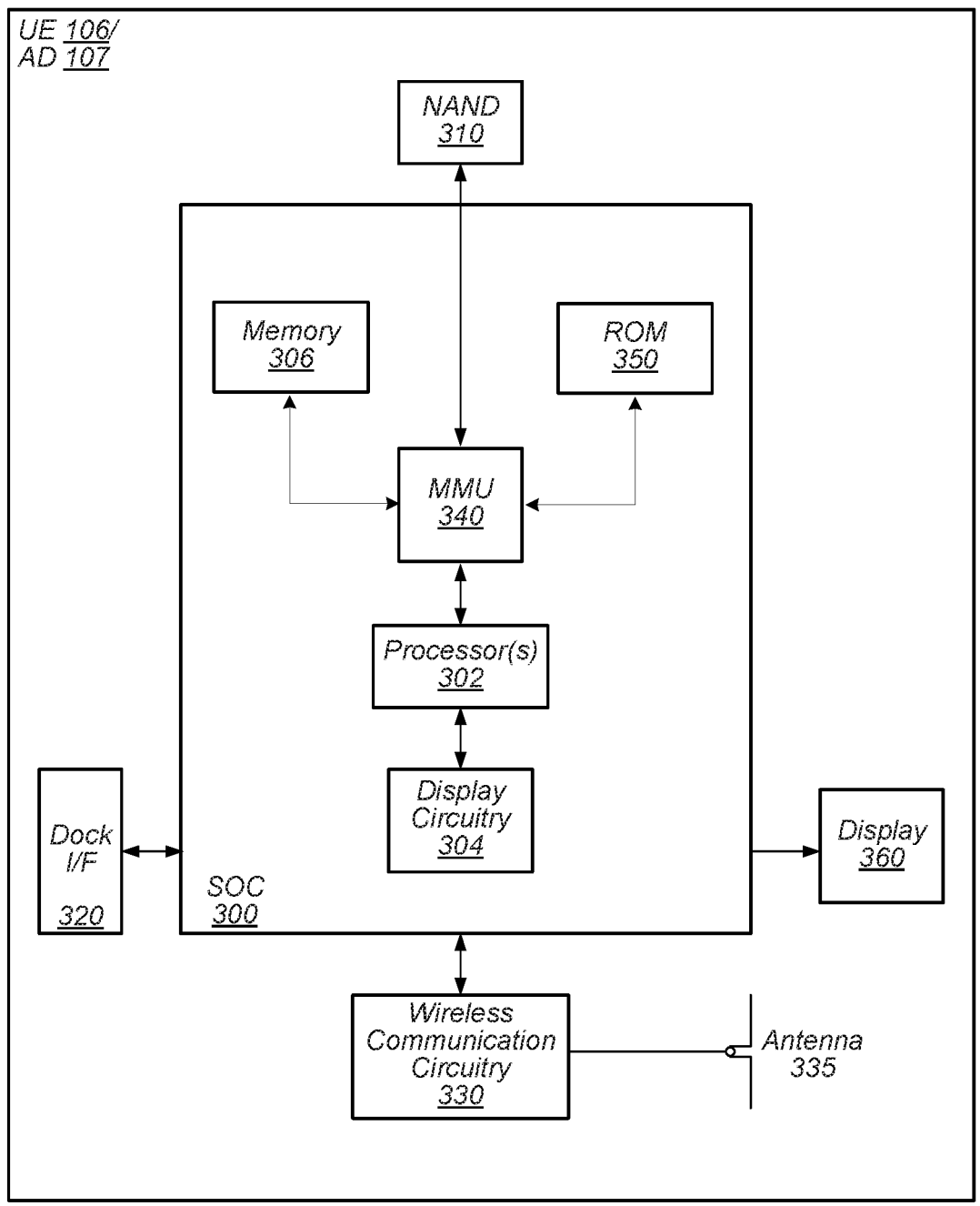
FIG. 3 is a block diagram illustrating an example UE, e.g., a smart phone or wearable device, according to some embodiments.

FIG. 3—Example Block Diagram of a UE Device

FIG. 3 illustrates one possible block diagram of a UE device 106 or a wearable or accessory device 107. As shown, the UE/AD 106/107 may include a system on chip (SOC) 300, which may include portions for various purposes. For example, as shown, the SOC 300 may include processor(s) 302 which may execute program instructions for the UE/AD 106/107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read-only memory (ROM) 350, Flash memory 310). The MMU 340 may be configured to perform memory protection and page table translation or setup. In some embodiments, the MMU 340 may be included as a portion of the processor(s) 302.

The UE/AD device 106/107 may also include other circuits or devices, such as the display circuitry 304, radio 330, connector I/F 320, and/or display 360.

In the embodiment shown, ROM 350 may include a bootloader, which may be executed by the processor(s) 302 during bootup or initialization. As also shown, the SOC 300 may be coupled to various other circuits of the UE/AD device 106/107. For example, the UE device 106/107 may include various types of memory, a connector interface 320 (e.g., for coupling to a computer system), the display 360, and wireless communication circuitry (e.g., for communication using LTE, CDMA2000, Bluetooth, WiFi, NFC, GPS, etc.).

The UE device 106/107 may include at least one antenna, and in some embodiments multiple antennas, for performing wireless communication with base stations and/or other devices. For example, the UE device 106/107 may use antenna 335 to perform the wireless communication. As noted above, the UE 106/107 may in some embodiments be configured to communicate wirelessly using a plurality of wireless communication standards or radio access technologies (RATs).

As described herein, the UE device 106 and/or the accessory device 107 may include hardware and software components for implementing methods according to embodiments of this disclosure. The processor 302 of the UE/AD device 106/107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Modern small form-factor wireless devices such as an accessory device 107 (e.g., wearable devices, smart watches and other types of devices) may be equipped with both a short-range radio configured to pair and communicate with a companion device (e.g., a user equipment (UE) device such as a smart phone) as well as a cellular radio to independently communicate with a cellular base station. For example, modern accessory devices may be configured to independently connect to a base station to transmit and receive voice, text, and data with a network, even when it is not paired to a companion device. In some embodiments, the accessory device may have an independent phone number from its companion device, which it may use to communicate with the network when it is acting as an independent cellular device. Alternatively, when paired with the companion device, the accessory device may simply serve as a relay to communicate voice and data to a user, while the phone number of the companion device is used to communicate with the network.

As used herein, an accessory device (AD), such as the AD 107 illustrated in FIGS. 1-3, is taken to refer to any of a variety of small form-factor devices, with or without an independent cellular radio and with or without an associated companion device such as a UE 106.

Figure 4:
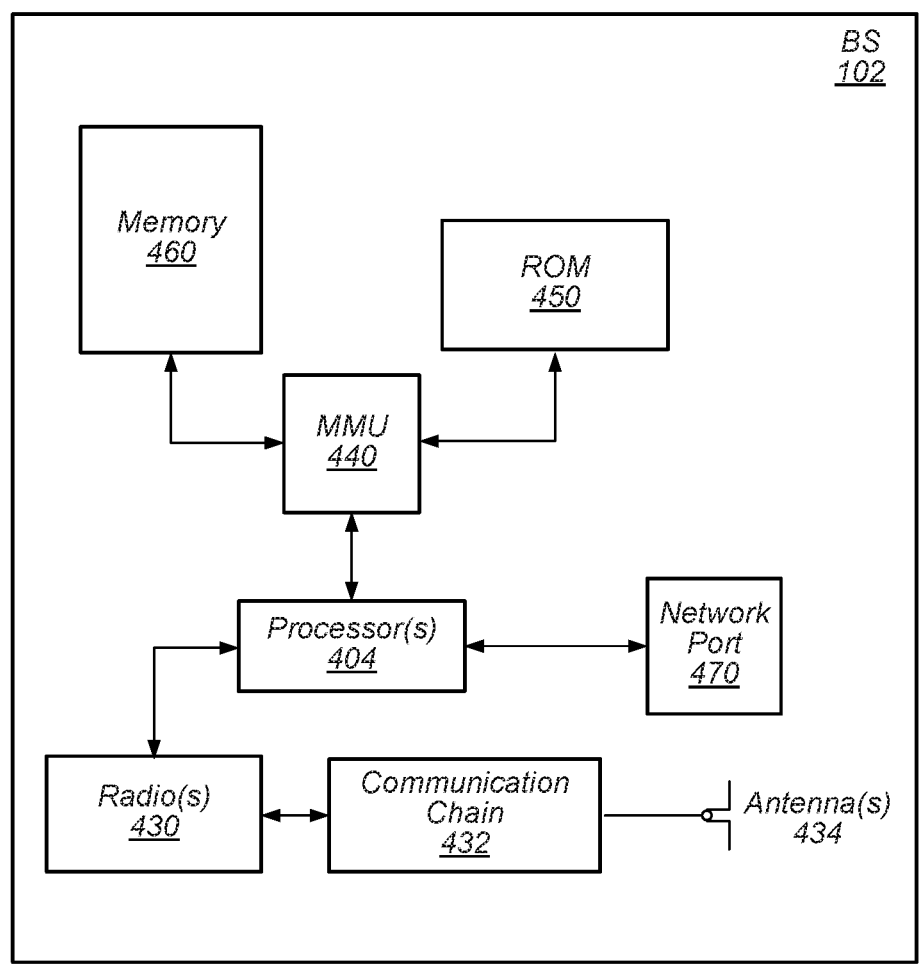
FIG. 4 illustrates an exemplary block diagram of a base station, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein.

Texting in Roaming Environment

In some embodiments, an AD and/or a UE may operate in a roaming environment, where texting applications may not function properly and/or where additional charges may be incurred for utilizing texting applications. For example, a typical short message service (SMS) message may be first sent to the home carrier's SMS Service Center (SMSC). However, if the device is roaming, the SMS may reach a different SMSC, possibly in a different country, leading to confusion and/or denial of service. Additionally, in some embodiments, the AD and/or the UE may be configured with a "save our ship", or "SOS" feature wherein the user may present input to the device to indicate that the user is in distress. In these embodiments, activation of the SOS feature may cause the device to periodically transmit a text message to an emergency contact, such as an emergency agency (e.g., text-911 (T-911) or the like) or to one or more custom emergency contacts configured on the device. However, if the device is in a roaming scenario, the emergency text may be unsuccessful. To address these and other concerns, various enhancements may be implemented, according to various embodiments.

Enhanced Security and eSIM Utilization in UE Devices

As personal wireless devices, or user equipment (UE) devices 106, such as smart phones and accessory devices 107 become increasingly sophisticated, they unfortunately also become a potential target for theft. Further, as these UE devices increasingly contain personal financial and other information, having such a device stolen may have severe negative consequences for owner of the device. Some embodiments herein present methods and devices to enhance wireless device security and increase the likelihood of recovering a lost or stolen device. In some UE devices, in addition to the physical subscriber identity module (SIM) card that the device may use to establish a connection with a cellular network, the UE device may configure an electronic subscriber identity module (eSIM) that is installed or downloaded onto the device, rather than being instantiated as a physical card. Some embodiments herein describe methods and devices to utilize an eSIM for enhanced security, device recovery, and/or service enhancements.

When a device is stolen, the person who steals the phone may attempt to remove the physical SIM card from the phone and/or to turn the phone off, to avoid connectivity of the phone to the network so that the owner cannot track the location of the phone. In these cases, the phone may have its contents for network connectivity erased. Further, even if a stolen or lost device is successfully connected to the network, a loss of the battery charge within a few hours may make the phone untrackable, giving law enforcement and/or the user a limited time window to track the phone. Embodiments herein present security and device recovery enhancements to address these and other concerns.

Further, when a UE does not have an active subscription with a network (e.g., through a SIM card or a WiFi connection), essential or important services like 'find my phone' services, emergency messaging, and other important features may not be functional. Embodiments herein describe methods to obtain cellular connectivity in these and other scenarios, thus enhancing the efficacy of these important services.

Figure 5A:
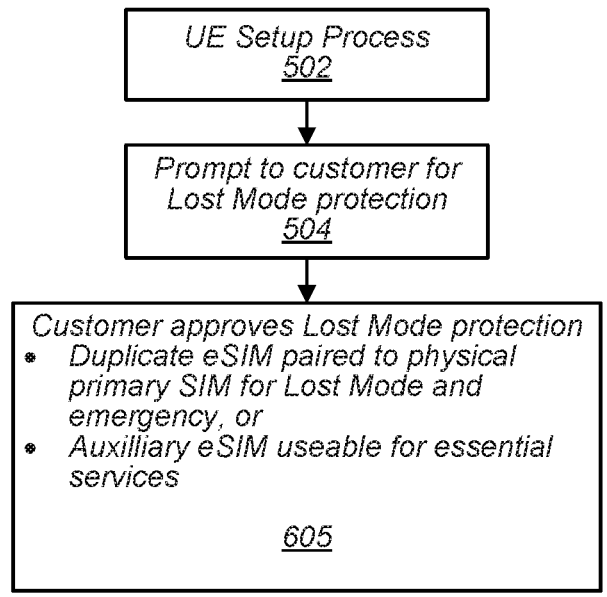
FIG. 5A is a flowchart diagram illustrating a UE setup process, according to some embodiments.
Figure 5B:
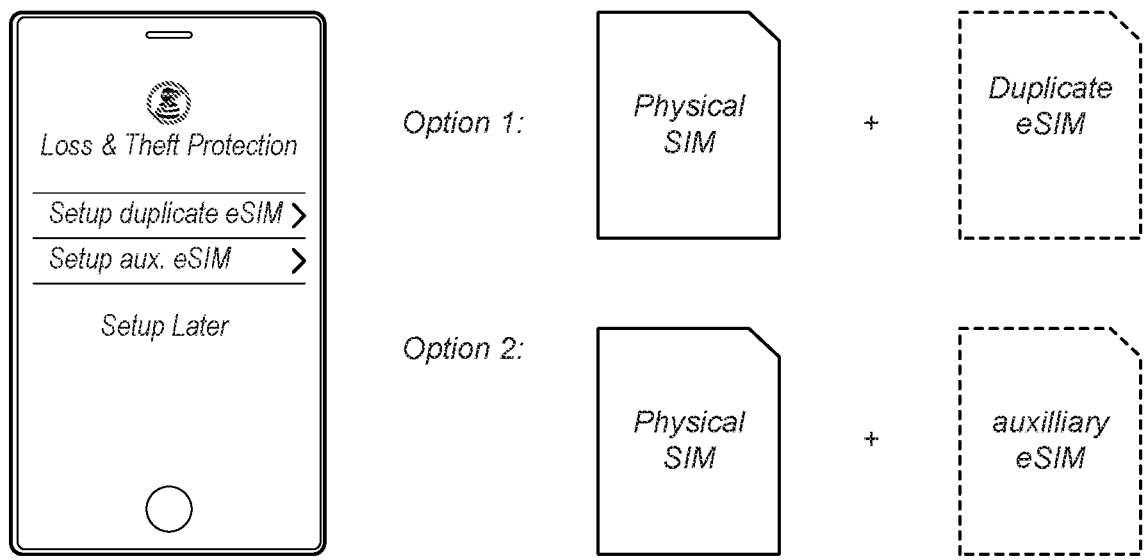
FIG. 5B illustrates a user-interface for setting up an eSIM in a UE device, according to some embodiments.

FIGS. 5A-5B eSIM Initial Setup

FIG. 5A is a flowchart diagram illustrating a UE setup process, according to some embodiments. As illustrated, when the UE is initially set up by a user (e.g., after purchasing the device), the UE may prompt the user whether they would like to activate a "Lost Mode" protection protocol. If activated by the user, the device may download an eSIM from a network, to use in conjunction with the Lost Mode protection protocol. In some embodiments, the eSIM may function as a backup duplicate of a physical SIM of the UE. In other embodiments, the eSIM may be a separate auxiliary SIM which is funded by the end customer, a manufacturer of the UE, or any other third party operator, and may be configured to perform specific functions related to essential services, enhanced device security, and/or enhanced device recovery.

FIG. 5B illustrates a user-interface for setting up an eSIM in a UE device. As illustrated, a display of the UE may present different options for setting up the eSIM. As a first option, a duplicate eSIM may be set up, which may by paired with a physical SIM of the UE, and may share the same cellular plan as the physical SIM. For example, the duplicate eSIM may be configured with the same networking credentials as a physical SIM installed on the device, and the duplicate eSIM may be utilized in various scenarios, as described in greater detail below, to obtain access to the network associated with the physical SIM. As a second option, an auxiliary eSIM may be set up which may be used for certain essential services. For example, in some embodiments, a manufacturer of the UE may fund and establish auxiliary eSIMs for use in their manufactured UE devices, wherein the auxiliary eSIMs have access (paid by the manufacturer) for certain essential or important services such as emergency calls/texting or lost/stolen device recovery. The auxiliary eSIM may be associated with an entirely separate account from the physical SIM installed in the device, and may have limited network access that is restricted to only one or more essential services.

Utilization of either a duplicate eSIM or an auxiliary eSIM may allow access by a UE device to essential services when the physical SIM is removed or is otherwise unable to gain access to the network. For example, if the UE device is roaming and the physical SIM is associated with a cellular account that does not enjoy roaming access, or if the voice and/or data plan associated with the physical SIM has run out of minutes and/or data, the UE may be unable to access essential services via the physical SIM. In these embodiments, and as described in greater detail below, an eSIM may be utilized to ensure access to essential services.

In some embodiments, an eSIM may be automatically downloaded onto a UE device upon initial setup of the UE device. For example, as illustrated in the top half of FIG. 6, upon initial activation of a UE device (e.g., after a user purchases the UE device and turns it on to obtain cellular access), the UE device may contact an activation server and may download an eSIM from a eSIM server. Alternatively, in some embodiments a user of a UE device may elect to download an eSIM after initial activation. For example, as illustrated in the bottom half of FIG. 6, a UE device may transmit a post-activation request to an activation server, and may receive a push message from the activation server, whereupon the UE device may download the eSIM from an eSIM server.

Figure 7:
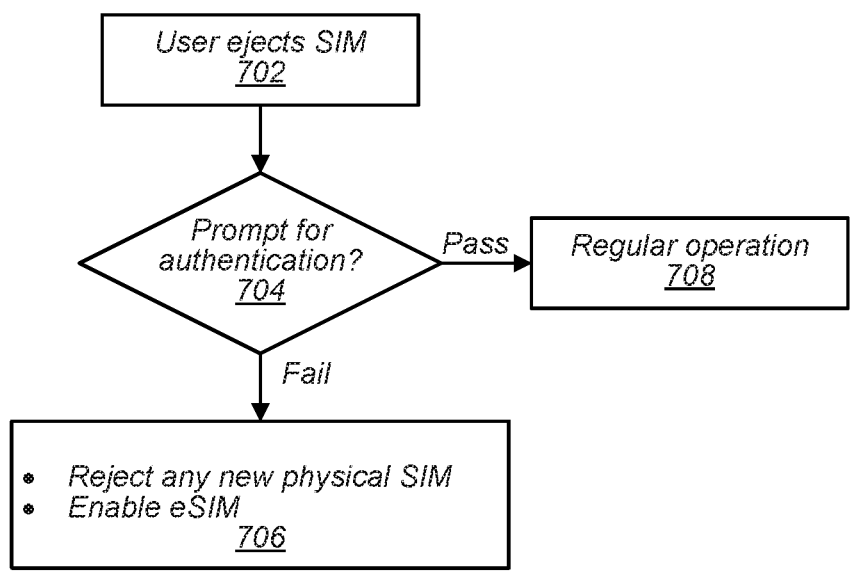
FIG. 7 is a flowchart diagram illustrating a method for preventing unauthenticated SIM ejection, according to some embodiments.

FIG. 7—Unauthenticated SIM Ejection

FIG. 7 is a flowchart diagram illustrating a method for preventing unauthenticated SIM ejection, according to some embodiments.

At 702, a user ejects a physical SIM card from a UE device 106 or accessory device (AD) 107. For example, a UE device may have one or more physical SIM cards installed, with a latch that enables access to the SIM card, which may be switched out for a different SIM card to alter to a cellular voice and/or data plan accessible by the UE device.

At 704, the UE may present an authentication prompt based at least in part on the ejection of the physical SIM card. For example, the UE may prompt the user to enter an authentication passcode, or it may initiate a fingerprint, facial recognition, or another type of authentication procedure (as one example, a prompt may be presented to enter a special code from the device manufacturer, a network operator, or an authorized reseller). The authentication prompt may serve to verify that the user who ejected the physical SIM card or inserted a new physical SIM card is the rightful owner (or potentially the new owner if the device has been resold) of the device, and to frustrate attempts by a thief who has stolen the device to remove the SIM card.

At 706, if the authentication procedure is successful, the UE may proceed with its normal operation. In other words, the UE may determine that the SIM ejection was performed by the owner of the device, and may allow the device to proceed with its normal operations.

At 708, if the authentication procedure is unsuccessful, the UE may infer that a bad actor may have removed the physical SIM (e.g., potentially because the UE has been stolen), and may implement one or more enhanced security protocols. For example, as part of the enhanced security protocol, the UE may reject any new physical SIM that is inserted into the device and alternatively and/or additionally disable access to applications and/or data on the device, backup data to a cloud service (e.g. iCloud™) and/or reset the device to factory settings. Additionally or alternatively, the UE may activate an eSIM of the device as a backup SIM, so that the UE may be able to maintain a connection with the network and increase the likelihood that the owner of the UE is able to locate the UE. For example, the UE may activate an eSIM and utilize the eSIM to gain access to a cellular network and to transmit location information of the UE to a network entity associated with a "find my device" application, to assist the owner of the UE and/or the law enforcement authorities in locating the stolen or missing device. In various embodiments, the eSIM may be either a duplicate eSIM or an auxiliary eSIM, as described in greater detail above.

Figure 8A:
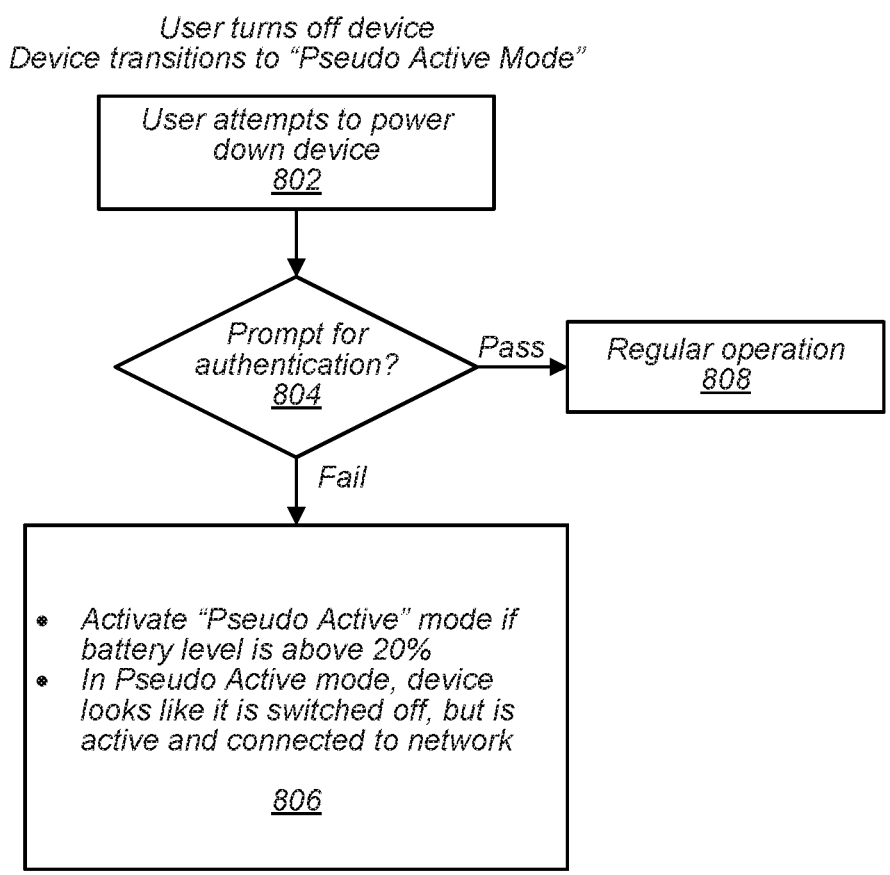
FIGS. 8A-8B are flowchart diagrams illustrating methods for implementing enhanced security protocols in response to an unauthenticated powering off of a UE device, according to some embodiments.
Figure 8B:
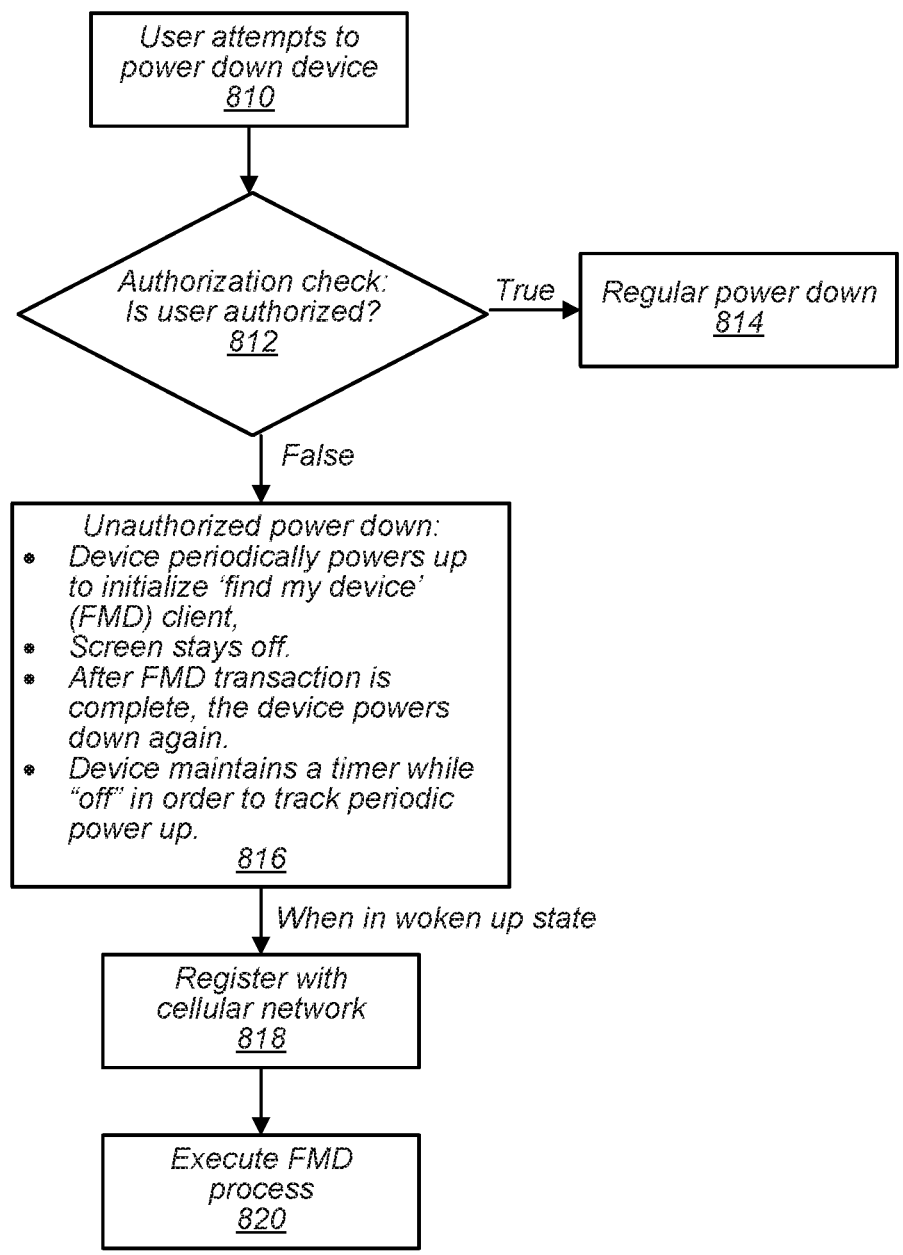

FIGS. 8A-B—Unauthenticated Powering Off of UE Device

FIG. 8A is a flowchart diagram illustrating a similar method to FIG. 7, wherein enhanced security protocols are enabled in response to an unauthenticated powering off of the UE device.

At 802, a user of the device may attempt to power off the UE device. For example, the user may press a hardware button of the UE device or present other user input to power off the UE device.

At 804, in response to the power off attempt, the UE may present an authentication prompt. For example, the UE may prompt the user to enter an authentication passcode, or it may initiate a fingerprint, facial recognition, or another type of authentication procedure. The authentication prompt may serve to verify that the user who attempted to power off the UE device is the rightful owner of the device, and to frustrate attempts by a thief who has stolen the device to power off the device and prevent its recovery by the owner.

At 806, if the authentication procedure is successful, the UE may proceed with its normal operation. In other words, the UE may determine that the power off attempt was performed by the owner of the device, and may proceed to turn off the UE.

At 808, if the authentication procedure is unsuccessful, the UE may infer that a bad actor may have attempted to power off the device, and may implement one or more enhanced security protocols.

In some embodiments, if the remaining battery level of the UE is above a predetermined threshold (e.g., above 20% as illustrated in FIG. 8, although other percentage thresholds are also possible), the UE may enter a "Pseudo-Active" mode. In the Pseudo-Active mode, the UE may turn off the display of the UE and/or may disable hardware buttons of the UE. Accordingly, the current user of the device (who may have stolen the device) may think that the UE has been successfully powered off, as the device may appear to have been successfully turned off. However, the UE may maintain an active connection with the network while in Pseudo-Active mode, and may utilize this connection to increase the likelihood that the rightful owner of the device recovers the lost or stolen device. More specifically, the application processor and the baseband processor of the UE may remain continuously active (at least until the battery level falls below the predetermined threshold, as described in greater detail below), thereby enabling connectivity to the network. In some embodiments, the UE may transmit location information (e.g., GPS coordinates or other location information) to a network entity and/or send a message to an emergency contact number and/or email previously programed to facilitate the owner and/or law enforcement in locating the UE. Advantageously, these embodiments may maintain the device in an active state to increase the likelihood of device recovery by the owner when an unauthorized user attempts to power off the device. Additionally and/or alternatively, it may initiate a cloud backup of data on the device, if possible, and then reset the device to factory settings to preserve and/or secure customer data.

FIG. 8B is a flowchart diagram similar to FIG. 8A, except that FIG. 8B illustrates an embodiment where an unauthorized user attempts to power off a UE device while the remaining battery life of the UE device is below a predetermined threshold (e.g., below 20%, or below another predetermined threshold.

Steps 810-814 proceed similarly to steps 802-804 described above in reference to FIG. 8, wherein a user attempts to power off the UE device (e.g., by pressing a hardware button or presenting other user input to power off the device) and, in response, an authentication procedure is initiated. If the authentication procedure is successful, the device powers off as normal at step 814.

At 816, if the authentication procedure is unsuccessful, and further if the remaining battery level of the UE device is below a predetermined threshold, the UE may enter a Pseudo-Power Off mode (e.g., instead of entering the Pseudo-Active mode when the remaining battery level is above the threshold). As illustrated, while in the Pseudo-Power Off mode, the UE device enters a low power state wherein the UE powers off its radio, application processor, and/or display. However, the UE may maintain a timer while the device is in the Pseudo-Power Off mode, and the UE may periodically power up its radio upon expiration of the timer to register with a network, (e.g. a cellular network, a WiFi network, or any other network that enables connectivity with the internet) at 818 and execute a 'find my device' process at 820 (e.g., by transmitting location information to a network entity associated with a 'find my device' service). After completing the transmission of location information to the network entity, the UE device may again enter the low power state (e.g. Airplane Mode or 3GPP-defined Power Save Mode (PSM)) and reinitiate the timer. The timer may be of an appropriate duration, such as 20 minutes or another duration and may be specified by a network entity (e.g. by the 3GPP network in the case of Power Save Mode or by the Find My Device application server), such that the battery life may be significantly extended while only intermittently powering on to transmit location information during the Pseudo-Power Off mode.

In some embodiments, the UE may transition from the Pseudo-Active mode to the Pseudo-Power Off mode in response to the battery level of the UE dropping below the predetermined threshold after the Pseudo-Active mode has been initiated. In other words, if Pseudo-Active mode is initiated through the method described in FIG. 8, and the battery level subsequently drops below the predetermined threshold, the UE may automatically transition to Pseudo-Power Off mode to preserve power.

Figure 9:
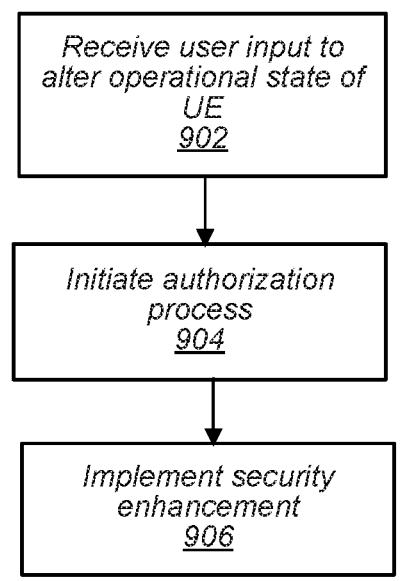
FIG. 9 is a flowchart diagram illustrating a method for implementing a security enhancement based on unauthorized user input to alter an operational state of a UE, according to some embodiments.

FIG. 9—Unauthorized User Input and Security Enhancement

FIG. 9 is a flowchart diagram illustrating a method for implementing a security enhancement based on unauthorized user input to alter an operational state of a UE, according to some embodiments. FIG. 9 describes a more general method of which FIGS. 7 and 8A-8B may be understood to describe more specific examples.

At 902, user input may be received to alter an operational state of the UE. In some embodiments, the user input to alter the operational state of the UE includes an ejection of a physical subscriber identity module (SIM) card installed in the UE. In some embodiments, the user input to alter the operational state of the UE includes an attempt to power down the UE. In yet other embodiments, it may include a user input received over the network (e.g. by a "find my device" server) for the server to periodically refresh location information of a device marked as stolen or lost by the owner of the device.

At 904, an authorization process is initiated at least in part in response to receiving the user input to alter the operational state of the UE. The authorization process may include one or more of a prompt to enter a password or passcode, a fingerprint verification process, a voice or facial recognition process, or another type of verification process.

At 906, in response to determining that the authorization process has failed, a security enhancement is implemented for the UE. In some embodiments, the security enhancement includes rejecting any new physical SIM card that is inserted into the UE and/or enabling an electronic SIM (eSIM) of the UE. In some embodiments, the security enhancement includes disabling one or more hardware buttons of the UE and/or reducing/disabling access to data and/or applications on the UE device.

In some embodiments, the security enhancement includes entering a "Pseudo-Active Mode" as described above, wherein, while in the Pseudo-Active Mode, the UE is configured to power down a display of the UE and maintain an active connection with a network. In some embodiments, while in the Pseudo-Active Mode, the UE is configured to periodically transmit location information of the UE to the network.

In some embodiments, the UE is further configured to determine that a remaining battery level of the UE has fallen below a predetermined threshold while the UE is in Pseudo-Active Mode. At least in part in response to determining that the remaining battery level of the UE has fallen below the predetermined threshold while the UE is in Pseudo-Active Mode, the UE may enter a "Pseudo-Power Off Mode", wherein the UE is configured to periodically power off the radio of the UE while in the Pseudo-Power Off Mode. In some embodiments, if the remaining battery level of the UE is already below the predetermined threshold when the authorization process fails at step 906, the UE device may enter Pseudo-Power Off Mode directly (i.e., without first entering Pseudo-Active Mode).

In some embodiments, the security enhancement includes automatically connecting to an available wireless local area network (WLAN) and transmitting location information of the UE to a remote entity through the WLAN. The remote entity may be associated with a cloud-based or other network-based service that offers a device recovery service. For example, the remote entity may be associated with a "Find My Device" service that an owner of the UE device may be able to access through the internet to assist the owner in recovering a lost or stolen device.

In some embodiments, the UE further includes a camera, and the security enhancement includes automatically taking a photograph silently (e.g. without producing a shutter noise and/or without haptic feedback) using the camera and automatically transmitting the photograph to a network using the radio. In some embodiments, said automatically taking the photograph using the camera is performed further in response to detecting that a user's face is exposed to the camera of the UE.

Figure 10:
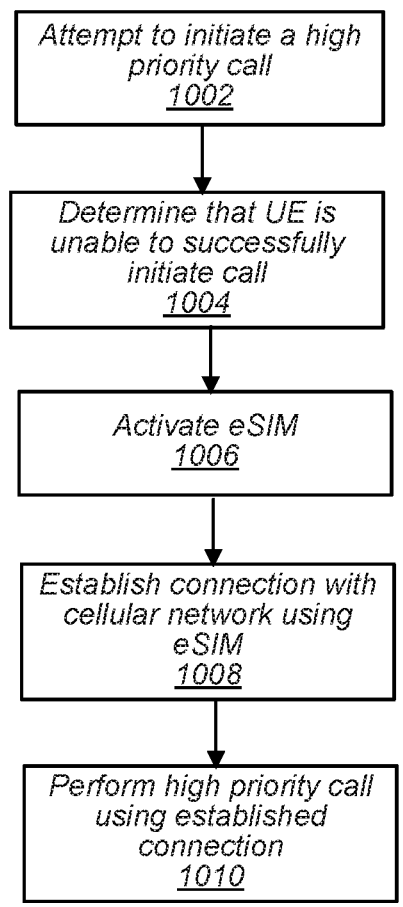
FIG. 10 is a flowchart diagram illustrating a method to utilize an eSIM for performing a high priority call, according to some embodiments.

FIG. 10—Utilizing eSIM for High Priority Calls

FIG. 10 is a flowchart diagram illustrating a method to utilize an eSIM for performing a high priority call or an essential service, according to some embodiments.

At 1002, a UE device may attempt to initiate a high priority call. The high priority call or the essential service may be of a variety of types of calls and/or data transfers, according to different embodiments, such as emergency (e.g., SOS) call, an emergency texting session, a transmission associated with a Find My Device protocol, or another type of high priority call or essential service. The high priority call may be either of a circuit switched (CS) call of a packet switched (PS) call.

At 1004, it may be determined that the UE is unable to successfully initiate the high priority call or essential service. In various embodiments, the UE may determine that it is unable to initiate the high-priority call or essential service by one or more of: a) determining that the UE is in a roaming environment and is unable to initiate the high-priority call while roaming, b) determining that a physical subscriber identity module (SIM) card of the UE has been removed, c) determining that a cellular access plan of the UE has run out of one or both of data and/or minutes for performing the high-priority call or essential service and/or d) another connectivity medium (e.g. WiFi) is not available.

At 1006, in response to determining that the UE is unable to successfully initiate the high-priority call or essential service, a currently active physical SIM card of the UE device may be disabled, and an eSIM of the UE may be activated. The eSIM may be either a duplicate eSIM or an auxiliary eSIM, as described in greater detail above. The eSIM may be associated with a cellular voice and/or data account that has access to a cellular network while roaming, in some embodiments.

At 1008, the UE may establish a connection with a cellular network using the eSIM. For example, the UE may use the network subscription credentials of the eSIM as if the eSIM were a physical SIM card, to communicate with the cellular network and establish the connection.

At 1010, the UE may perform the high priority call or essential service using the established connection. In some embodiments, performing the high-priority call or essential service includes transmitting location information of the UE to the cellular network.

Figure 11:
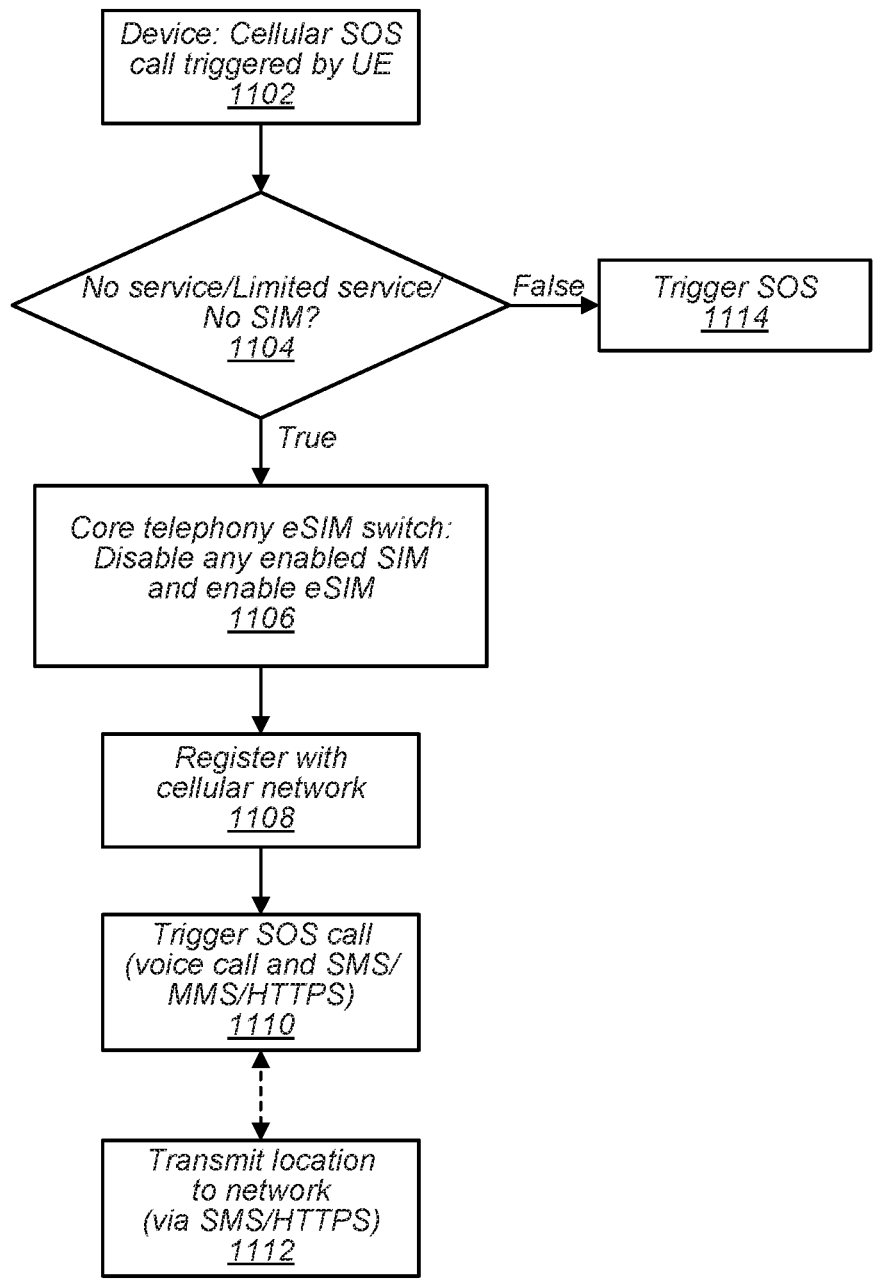
FIG. 11 is a flowchart diagram illustrating a method for utilizing an eSIM to conduct an emergency call, according to some embodiments.

FIG. 11—Utilizing eSIM for Emergency Call

FIG. 11 is a flowchart diagram similar to FIG. 10 that illustrates a method for utilizing an eSIM to conduct an emergency call, according to some embodiments.

At 1102, a cellular emergency call (or an emergency texting session) is initiated by a UE. The call may be initiated in response to user input.

At 1104, it is determined whether the UE is able to conduct the emergency call. For example, it may be determined whether the UE is experiencing no service or limited service, whether the UE is roaming, or whether the UE has a functional SIM activated to conduct the emergency call.

At 1114, based on a determination that the UE is able to conduct the emergency call, the UE may proceed to conduct the emergency call as normal.

At 1106, based on a determination that the UE is not able to conduct the emergency call, any currently enabled physical SIM card of the UE may be disabled and an eSIM of the UE may be enabled.

At 1108, the UE may register with a cellular network using the eSIM and establish a cellular connection with the cellular network.

At 1110, the UE initiates the emergency call or texting session using the established cellular connection.

AT 1112, the UE may (optionally) transmit location information to the cellular network using the established connection, if transmission of location information is utilized in the emergency call or texting session.

Figure 12:
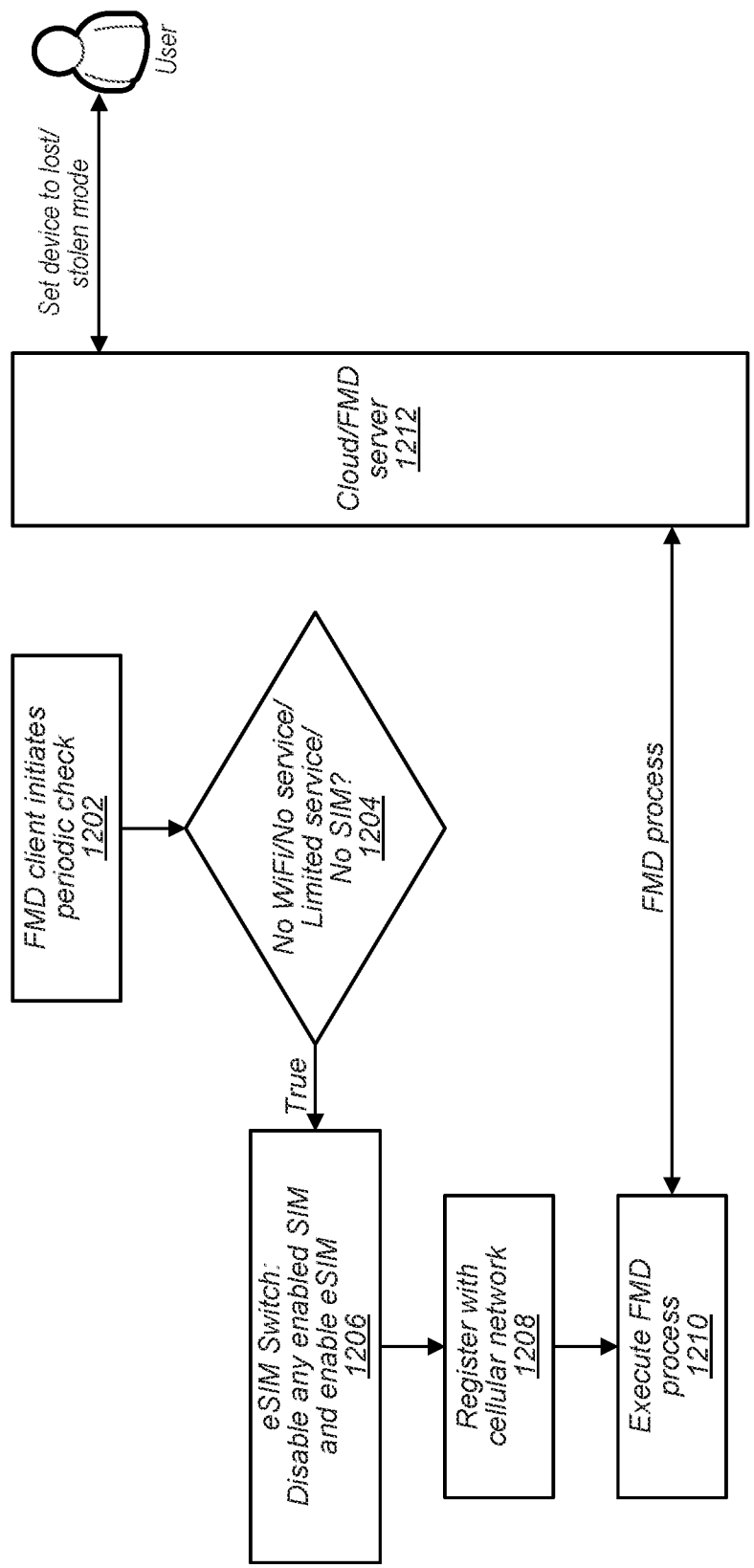
FIG. 12 is a flowchart diagram illustrating a method for utilizing an eSIM to perform a 'find my device' protocol, according to some embodiments.

FIG. 12—Utilizing eSIM to Find Lost Device

FIG. 12 is a flowchart diagram similar to FIG. 10 that illustrates a method for utilizing an eSIM to perform a 'Find My Device' protocol, according to some embodiments.

At 1202, a Find My Device (FMD) client on the UE initiates a periodic check to see whether it should initiate a transmission to a FMD server over a network. For example, the UE may have previously received instructions from the network to initiate the FMD protocol (i.e., because the owner of the UE initiated an FMD protocol via the internet which was communicated to the UE via the network), and the UE may be configured to periodically transmit location information to the network as part of the FMD protocol.

At 1204, it is determined whether the UE is able to conduct the FMD transmission. For example, it may be determined whether the UE is experiencing no service or limited service, or whether the UE does not have a functional SIM activated to perform the FMD transmission. Alternatively, it may be determined that an active SIM card on the UE is in a roaming environment and the subscription associated with the active SIM card does not have roaming access. Alternatively, the active SIM card of the UE may have run out of data and/or minutes for conducting the FMD protocol.

At 1206, based on a determination that the UE is not able to conduct the FMD transmission, the currently enabled physical SIM card of the UE may be disabled and an eSIM of the UE may be enabled. The eSIM may be either a duplicate eSIM or an auxiliary eSIM, as described in greater detail above. The eSIM may be associated with a cellular voice and/or data account that has access to a cellular network while roaming, in some embodiments.

At 1208, the UE may register with a cellular network using the eSIM and establish a cellular connection with the cellular network using the eSIM.

At 1210, the UE executes the FMD process using the established cellular connection. The FMD process may establish communication with a cloud server and/or an FMD server 1212 to facilitate transmission of location information of the UE, which an owner of the UE may be able to utilize to assist in finding a lost or stolen UE. Additionally or alternatively, the UE may communicate a temporary callback number associated with the eSIM to the network.

Advantageously, according to embodiments described herein a UE device may be able to conduct a high priority call including the capability to transmit location data and a temporary call-back number to a Public Safety Answering Point (PSAP); while in scenarios where there is no cellular connectivity (e.g. if there is no service, limited service, no SIM card).

Lost Mode to Save Power and Support Device Recovery

Figure 13:
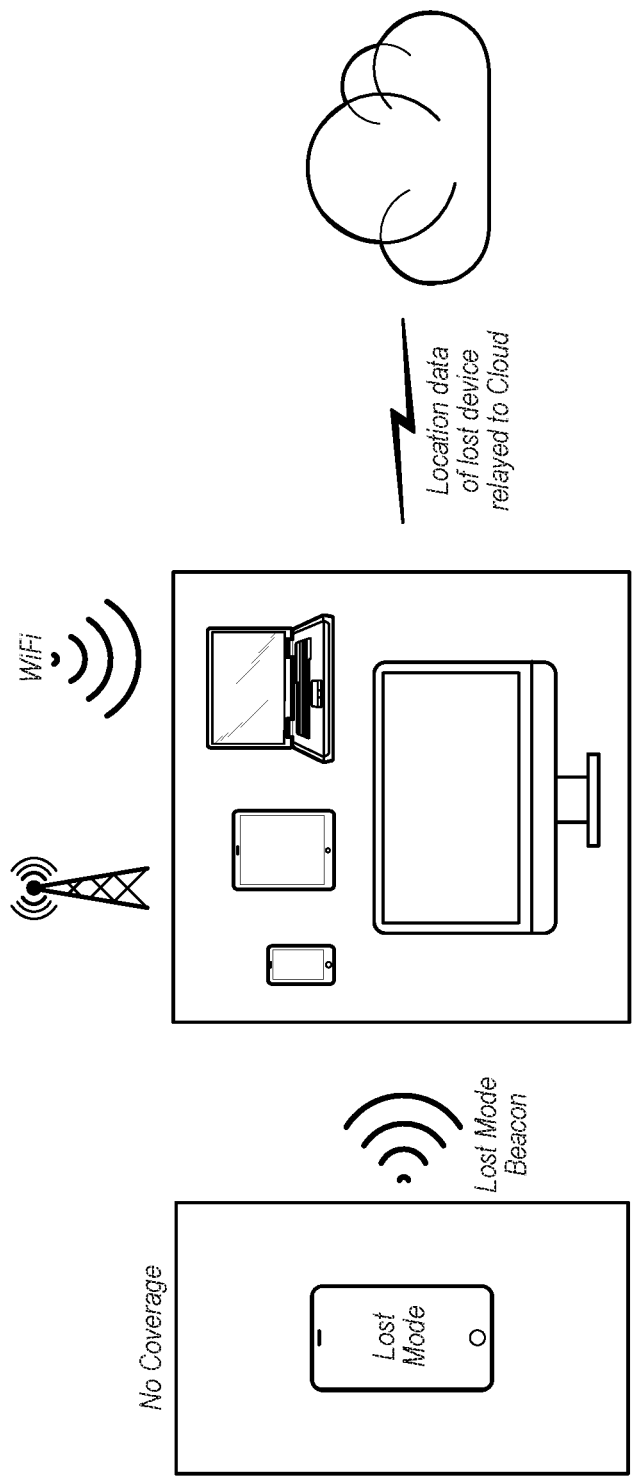
FIG. 13 is a schematic illustration of an implementation of "Lost Mode" by a UE device, according to some embodiments.
Figure 14:
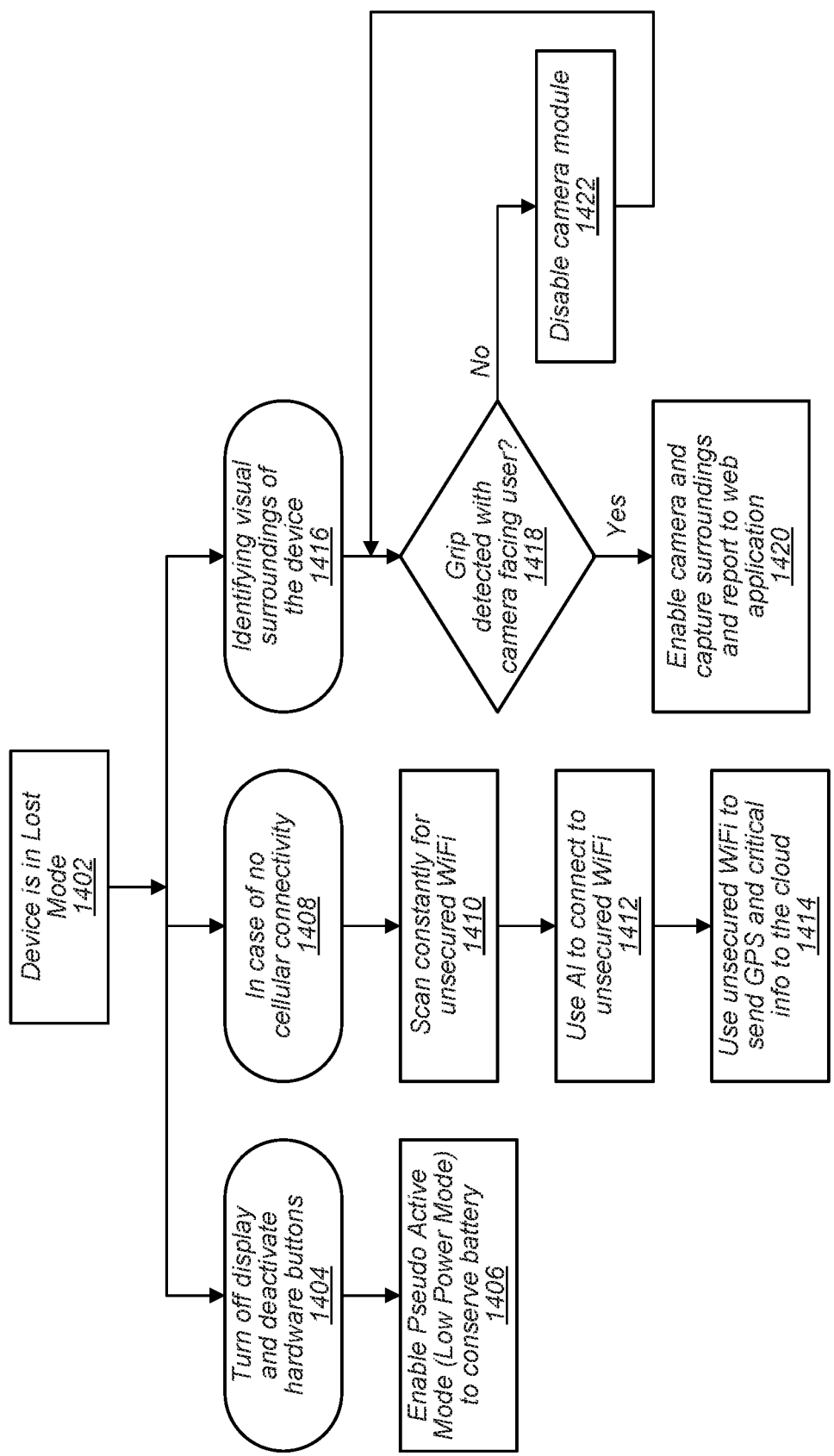
FIG. 14 is a flowchart diagram illustrating a method for implementing Lost Mode by a UE device, according to some embodiments.

In some embodiments, a UE device may be set in Lost Mode by an owner of the device through a web-based service. For example, if a user loses a UE device, the user may be able to access a web-based service through a separate device to activate the UE device into Lost Mode. Lost Mode functionality is illustrated schematically in FIG. 13 and as a flowchart in FIG. 14. The following paragraphs describe further enhancements for a UE device to increase the chance of being recovered while set to Lost Mode. The methods described in the following paragraphs may be used in conjunction with embodiments described in reference to FIGS. 8A-8B and 9, for example.

In some embodiments, the UE device display and UI may be switched off and may operate in a "Pseudo-Active Mode", as described in greater detail above. In this mode the display may be off and the baseband and GPS may be periodically activated based on a timer to report the location of the device. All Hardware buttons and/or the Universal Serial Bus (USB) interface may be disabled to avoid a user from powering off of the UE device.

In some embodiments, in the absence of available cellular service, the UE device may connect to any available unsecured Wi-Fi automatically, to report the GPS co-ordinates or other location information of the UE device. The UE device may intelligently detect an unsecured WiFi network. For example, artificial intelligence (AI) programming may be utilized to fill the web based connection form to accept Terms and Conditions of the WiFi network, to send the location information and/or other critical information which may help the owner to recover the stolen or lost device.

In some embodiments, a camera of the UE device may be configured to take a picture of a person holding the device upon detecting that a user is gripping the device, and the snapped picture may be uploaded to a web-based service. Accordingly, the rightful owner and/or law enforcement may be able to identify the person in possession of the potentially stolen device.

As described above, one aspect of the present technology is the gathering and use of data available from specific and legitimate sources to, for example, improve the reliability of location information associated with users for emergency text messaging or other text messaging applications. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to more accurately identify the location of the user in accordance with their preferences.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide location data for texting applications. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising a processor and configured for inclusion within a user equipment device (UE), wherein the apparatus is configured to cause the UE to:
    attempt to initiate a high-priority call using a physical subscriber identity module (SIM) card of the UE;
    determine that the UE is unable to successfully initiate the high-priority call with the physical SIM card;
    in response to determining that the UE is unable to successfully initiate the high-priority call with the physical SIM card, activate an electronic subscriber identity module (eSIM), wherein the eSIM comprises an auxiliary eSIM associated with a separate account from the physical SIM card, and wherein the separate account associated with the auxiliary eSIM has limited network access that is restricted to high-priority calls;
    establish a connection with a cellular network using the eSIM; and
    perform the high-priority call using the established connection.

2. The apparatus of claim 1, wherein determining that the UE is unable to initiate the high-priority call comprises determining that the UE is in a roaming environment and is unable to initiate the high-priority call while roaming.

3. The apparatus of claim 1, wherein determining that the UE is unable to initiate the high-priority call comprises determining that the physical card of the UE has been removed.

4. The apparatus of claim 1, wherein determining that the UE is unable to initiate the high-priority call comprises determining that a cellular access plan of the UE has run out of one or both of data or minutes for performing the high-priority call.

5. The apparatus of claim 1, wherein performing the high-priority call comprises transmitting location information of the UE to a device security application server through the cellular network.

6. A method, comprising:
    by a user equipment device (UE):
        attempting to initiate a high-priority call using a physical subscriber identity module (SIM) installed in the UE;
        determining that the UE is unable to successfully initiate the high-priority call with the physical SIM;
        in response to determining that the UE is unable to successfully initiate the high-priority call with the physical SIM card, activating an electronic subscriber identity module (eSIM), wherein the eSIM comprises an auxiliary eSIM associated with a separate account from the physical SIM, and wherein the separate account associated with the auxiliary eSIM has limited network access that is restricted to high-priority calls;
        establishing a connection with a cellular network using the eSIM; and
        performing the high-priority call using the established connection.

7. The method of claim 6, wherein determining that the UE is unable to initiate the high-priority call comprises one of:
    determining that the UE is in a roaming environment and is unable to initiate the high-priority call while roaming; or
    determining that a cellular access plan of the UE has run out of one or both of data or minutes for performing the high-priority call.

8. The method of claim 6, wherein determining that the UE is unable to initiate the high-priority call comprises determining that the physical card of the UE has been removed.

9. The method of claim 6, wherein performing the high-priority call comprises transmitting location information of the UE to a device security application server through the cellular network.

10. The apparatus of claim 1,
    wherein determining that the UE is unable to initiate the high-priority call comprises determining that Wi-Fi is not available for performing the high-priority call.

11. The apparatus of claim 1,
    wherein the high-priority call is associated with a Find My Device protocol.

12. The method of claim 6,
    wherein determining that the UE is unable to initiate the high-priority call comprises determining that Wi-Fi is not available for performing the high-priority call.

13. The method of claim 6,
wherein the high-priority call is associated with a Find My Device protocol.

14. A user equipment device (UE), comprising:
a radio; and
a processor operably coupled to the radio, wherein the UE is configured to:
- attempt to initiate a high-priority call using a physical subscriber identity module (SIM) installed in the UE;
- determine that the UE is unable to successfully initiate the high-priority call with the physical SIM;
- in response to determining that the UE is unable to successfully initiate the high-priority call with the physical SIM card, activate an electronic subscriber identity module (eSIM), wherein the eSIM comprises an auxiliary eSIM associated with a separate account from the physical SIM, and wherein the separate account associated with the auxiliary eSIM has limited network access that is restricted to high-priority calls;
- establish a connection with a cellular network using the eSIM; and
- perform the high-priority call using the established connection.

15. The UE of claim 14, wherein determining that the UE is unable to initiate the high-priority call comprises determining that the UE is in a roaming environment and is unable to initiate the high-priority call while roaming.

16. The UE of claim 14, wherein determining that the UE is unable to initiate the high-priority call comprises determining that the physical card of the UE has been removed.

17. The UE of claim 14, wherein determining that the UE is unable to initiate the high-priority call comprises determining that a cellular access plan of the UE has run out of one or both of data or minutes for performing the high-priority call.

18. The UE of claim 14, wherein performing the high-priority call comprises transmitting location information of the UE to a device security application server through the cellular network.

19. The UE of claim 14,
wherein the high-priority call is associated with a Find My Device protocol.

20. The UE of claim 14,
wherein determining that the UE is unable to initiate the high-priority call comprises determining that Wi-Fi is not available for performing the high-priority call.

* * * * *